(12) United States Patent
Dalmolin et al.

(10) Patent No.: US 9,145,234 B1
(45) Date of Patent: Sep. 29, 2015

(54) BAKING CUP WITH PULL TABS

(76) Inventors: Justin Dalmolin, North Palm Beach, FL (US); Jaime Snarski, North Palm Beach, FL (US)

( * ) Notice: Subject to any disclaimer, the term of this patent is extended or adjusted under 35 U.S.C. 154(b) by 307 days.

(21) Appl. No.: 13/606,264

(22) Filed: Sep. 7, 2012

Related U.S. Application Data

(60) Provisional application No. 61/545,633, filed on Oct. 11, 2011.

(51) Int. Cl.
| | | |
|---|---|---|
| *A21B 3/13* | (2006.01) | |
| *B65D 25/22* | (2006.01) | |
| *A23P 1/10* | (2006.01) | |
| *B65D 25/10* | (2006.01) | |
| *A23L 1/00* | (2006.01) | |
| *B31B 3/48* | (2006.01) | |

(52) U.S. Cl.
CPC .............. *B65D 25/22* (2013.01); *A21B 3/132* (2013.01); *A23L 1/0073* (2013.01); *A23P 1/10* (2013.01); *B31B 3/48* (2013.01); *B31B 2201/267* (2013.01); *B65D 25/103* (2013.01)

(58) Field of Classification Search
CPC ......... A23P 1/10; A23L 1/0073; A21B 3/132; B65D 25/103; B65D 25/20; B65D 25/22; B31B 2201/267; B31B 3/48
USPC ............. 249/112, 115, 134, DIG. 1; 426/512, 426/653; 220/750, 755, 771, 772, 495.03; 206/551, 804; 493/68–71, 79–81, 93, 493/245, 261
See application file for complete search history.

(56) References Cited

U.S. PATENT DOCUMENTS

| | | | | |
|---|---|---|---|---|
| 1,951,071 | A | * | 3/1934 | Stipe .............................. 249/112 |
| 2,170,040 | A | * | 8/1939 | Stuart ............................ 220/574 |
| 2,407,118 | A | * | 9/1946 | Waters .......................... 493/162 |
| 2,758,771 | A | * | 8/1956 | Bauer ............................ 229/402 |
| 3,565,324 | A | * | 2/1971 | Odenhagen .................... 229/170 |
| 3,701,467 | A | * | 10/1972 | Johansson ..................... 206/518 |
| 3,861,576 | A | * | 1/1975 | Tolaas et al. .................. 229/5.84 |
| 4,026,458 | A | * | 5/1977 | Morris et al. .............. 229/182.1 |
| 4,874,112 | A | * | 10/1989 | Mulder et al. ..................... 221/1 |
| D363,343 | S | * | 10/1995 | Azimi-Bolourian ......... D23/309 |
| 5,771,787 | A | * | 6/1998 | Hirano ............................. 99/426 |
| 6,237,845 | B1 | * | 5/2001 | Hashimoto et al. ........... 229/400 |
| 7,037,471 | B1 | * | 5/2006 | Perlman ....................... 422/551 |
| D530,144 | S | | 10/2006 | O'Flynn et al. |
| D530,562 | S | | 10/2006 | Brookshire et al. |

(Continued)

FOREIGN PATENT DOCUMENTS

GB         2231527 A  * 11/1990  ............... B28B 7/36

*Primary Examiner* — Yogendra Gupta
*Assistant Examiner* — Emmanuel S Luk

(57) ABSTRACT

A baking cup form comprising a baking cup body and at least one pair of pull-tabs. The baking cup body being formed by shaping a substrate, the shaped comprising a continuous sidewall extending from a base section, the continuous sidewall being shaped in an inverted frustum to form a receiving volume for receiving a batter for baking. Each pull-tab extends radially outward from an external surface of the baking cup body having one pull-tab being diametrically opposed to the second pull-tab. The pull-tabs may be a separate member bonded to the external surface of the baking cup body or fabricated by shaping the baking cup body substrate. The pull-tabs may be oriented having either a perpendicular or parallel relation to a base section of the baking cup body. The pull-tabs may be provided in an aesthetically pleasing shape.

5 Claims, 13 Drawing Sheets

(56) References Cited

U.S. PATENT DOCUMENTS

| | | |
|---|---|---|
| D531,448 S | 11/2006 | Boss et al. |
| D540,110 S | 4/2007 | Nichols et al. |
| D540,111 S | 4/2007 | Nichols et al. |
| D540,112 S | 4/2007 | Nichols et al. |
| D540,616 S | 4/2007 | Nichols et al. |
| 7,201,358 B2* | 4/2007 | Nichols et al. .......... 249/115 |
| D545,114 S | 6/2007 | Lion et al. |
| D572,520 S | 7/2008 | Lion et al. |
| 8,256,639 B1* | 9/2012 | Samuelson et al. .......... 220/575 |
| 2002/0147088 A1* | 10/2002 | Edwards .......... 493/80 |
| 2002/0185496 A1* | 12/2002 | Puerini .......... 220/738 |
| 2005/0211101 A1* | 9/2005 | Finnie .......... 99/279 |
| 2005/0238773 A1* | 10/2005 | Stease .......... 426/505 |
| 2006/0068070 A1* | 3/2006 | Nichols et al. .......... 426/512 |
| 2007/0102437 A1 | 5/2007 | Griswold |
| 2008/0095908 A1 | 4/2008 | Vendl et al. |
| 2008/0135719 A1 | 6/2008 | Vendl et al. |
| 2011/0031375 A1* | 2/2011 | Powell .......... 249/112 |
| 2011/0171352 A1* | 7/2011 | Lange .......... 426/138 |
| 2012/0294997 A1* | 11/2012 | Lange .......... 426/390 |

* cited by examiner

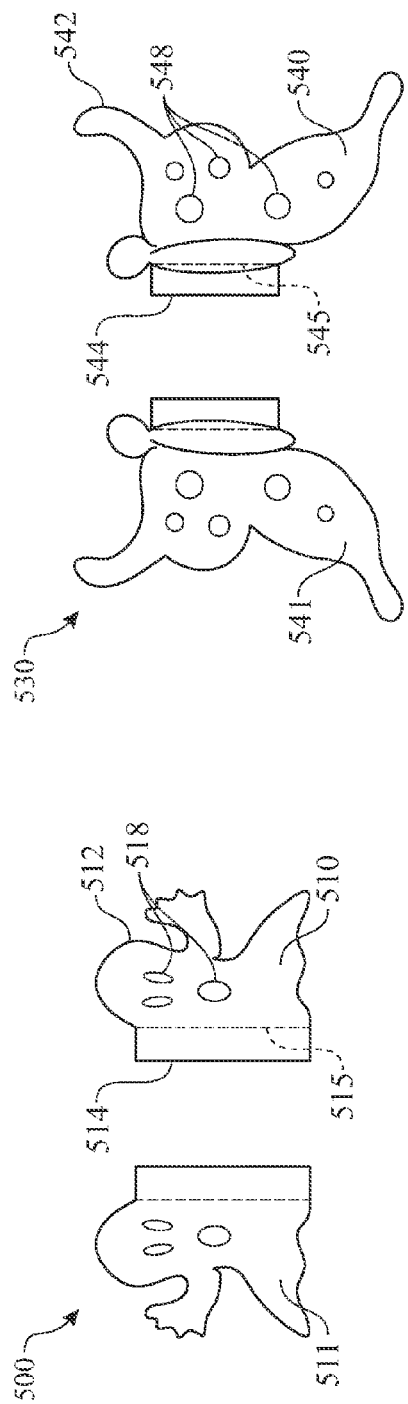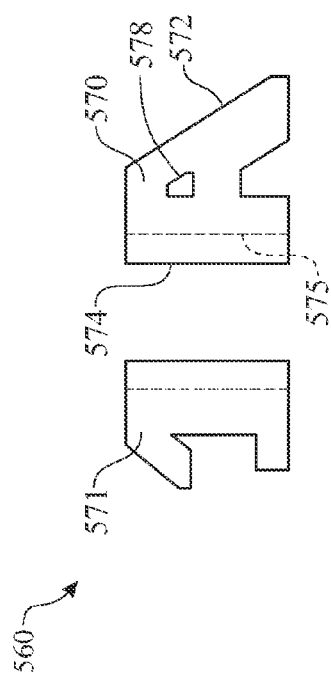
FIG. 9
FIG. 10
FIG. 11

US 9,145,234 B1

BAKING CUP WITH PULL TABS

CROSS-REFERENCE TO RELATED APPLICATION

This Non-Provisional Utility application claims the benefit of U.S. Provisional Patent Application Ser. No. 61/545,633, filed on Oct. 11, 2011, which is incorporated herein in its entirety.

FIELD OF THE INVENTION

The present disclosure generally relates to baking cup forms, and more particularly to a baking cup having a pair of pull-tabs for aid in separation and removal of the baking cup from baked goods.

BACKGROUND OF THE INVENTION

Cup cakes are one form of baked goods. Cup cakes refer to small sized cakes that are often baked in individual forms and took their name from the cups they were baked in. This is the use of the name that has persisted, and the name of "cupcake" is now given to any small cake that is about the size of a teacup.

Originally, cupcakes were baked in heavy pottery cups. Some bakers still use individual ramekins, small coffee mugs, large tea cups, or other small ovenproof pottery-type dishes for baking cupcakes.

Currently, cupcakes are usually baked in muffin tins. These pans are most often made from metal, with or without a non-stick surface, and generally have six (6) or twelve (12) depressions or "cups". The forms may alternatively be made from stoneware, silicone rubber, or other materials. A standard size cup is 3 inches (76 mm) in diameter and holds a volume of approximately 4 ounces (110 g) of ingredients. It is noted that other sizes, such as those for miniature and jumbo size cupcakes also exist. Specialty pans may offer many different sizes and shapes.

Individual baking cups, or cupcake liners, may be used in baking. These are typically round sheets of thin paper pressed into a round, fluted cup shape. Liners can facilitate the easy removal of the cupcake from the tin after baking, keep the cupcake moister, and reduce the effort needed to clean the pan. Liners aid in the packaging and distribution process. The use of liners is also considered a more sanitary option when cupcakes are being passed from hand to hand. Like cupcake pans, several sizes of paper liners are available, from miniature to jumbo.

In addition to paper, cupcake liners may be made from very thin aluminum foil or, in a non-disposable version, silicone rubber. Because they can stand up on their own, foil and silicone liners can also be used on a flat baking sheet, which makes them popular among people who do not have a specialized muffin tin. Some of the larger paper liners are not fluted and are made out of thicker paper, often rolled at the top edge for additional strength, so that they can also stand independently for baking without a cupcake tin. Some bakers use two or three thin paper liners, nested together, to simulate the strength of a single foil cup.

Prior to consumption, the cupcake liner is removed from the cupcake. The removal process is often completed by pinching the fluting and pulling the liner away from the baked product. The pinching process often removes a portion of the baked goods.

What is desired is a feature that would aid in separating a cupcake liner from a baked product without affecting the baked product.

SUMMARY OF THE INVENTION

The basic inventive concept provides a plurality of pull-tabs that are assembled to or integrated into a baking cup form. Each of a pair of pull-tabs are preferably diametrically opposed, enabling the consuming party an ability to pull on the tabs to separate the baking cup form from the baked product.

A first aspect of the present invention provides a separation aiding baking cup form comprising:

a planar substrate, the planar substrate having a series of pleats extending from a base transition radially outward terminating at a peripheral edge, wherein the series of pleats are shaped, creating a circumferential sidewall having an angular relation to a base section taking a shape of an inverted frustum to form a receiving volume for receiving a batter for baking; and at least one pair of pull-tabs, each pull-tab extending radially outward from an external surface of the inverted frustum and one diametrically opposed to the second.

A second aspect of the present invention orients the pull-tabs perpendicularly to a plane of the base section.

In another aspect, the pull-tabs are oriented parallel to the plane of the base section.

In yet another aspect, the pull-tabs further comprise a tab attachment flange. The tab attachment flange may be formed by folding a section of the pull-tab generally perpendicular to the tab.

In yet another aspect, the pull-tabs may be created by bonding two adjacent tab-forming sections of the sidewall together.

In yet another aspect, the pull-tabs may be created by forming two adjacent tab forming sections of the sidewall together creating a void therebetween, wherein the void enables nesting of a plurality of baking cup forms.

In yet another aspect, the two adjacent tab-forming sections can be shaped in an aesthetically pleasing shape.

In yet another aspect, the two adjacent tab forming sections can further comprise an aperture formed therethrough, wherein when the baking cup is formed, the apertures align forming a single aperture to aid in gripping the pull-tab.

In yet another aspect, the baking cup form may have a circular shape.

In yet another aspect, the baking cup form may have a rounded shape.

In yet another aspect, the baking cup form may have a rectangular shape.

In yet another aspect, the baking cup form may have a square shape.

In yet another aspect, the pull-tabs may include decorative features to resemble recognizable objects. A shape of a peripheral edge, cutouts, applied artwork, embossing, and the like may provide the decorative features. The decorative features may be representative of a holiday, an event, an animal, a vehicle, numeric characters, alphabetical characters, symbolic characters, a cartoon character, and the like. The decorative tabs my be attachable by the end user to customize the cup cake forms, such as to identify an age of a person for a birthday celebration, a person's initials, and the like.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 9 presents an elevation view of a first exemplary pair of decorative pull-tabs, the exemplary embodiment being representative of a holiday;

FIG. 10 presents an elevation view of a second exemplary pair of decorative pull-tabs, the exemplary embodiment being representative of an animal;

FIG. 11 presents an elevation view of a third exemplary pair of decorative pull-tabs, the exemplary embodiment being representative of a set of characters;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
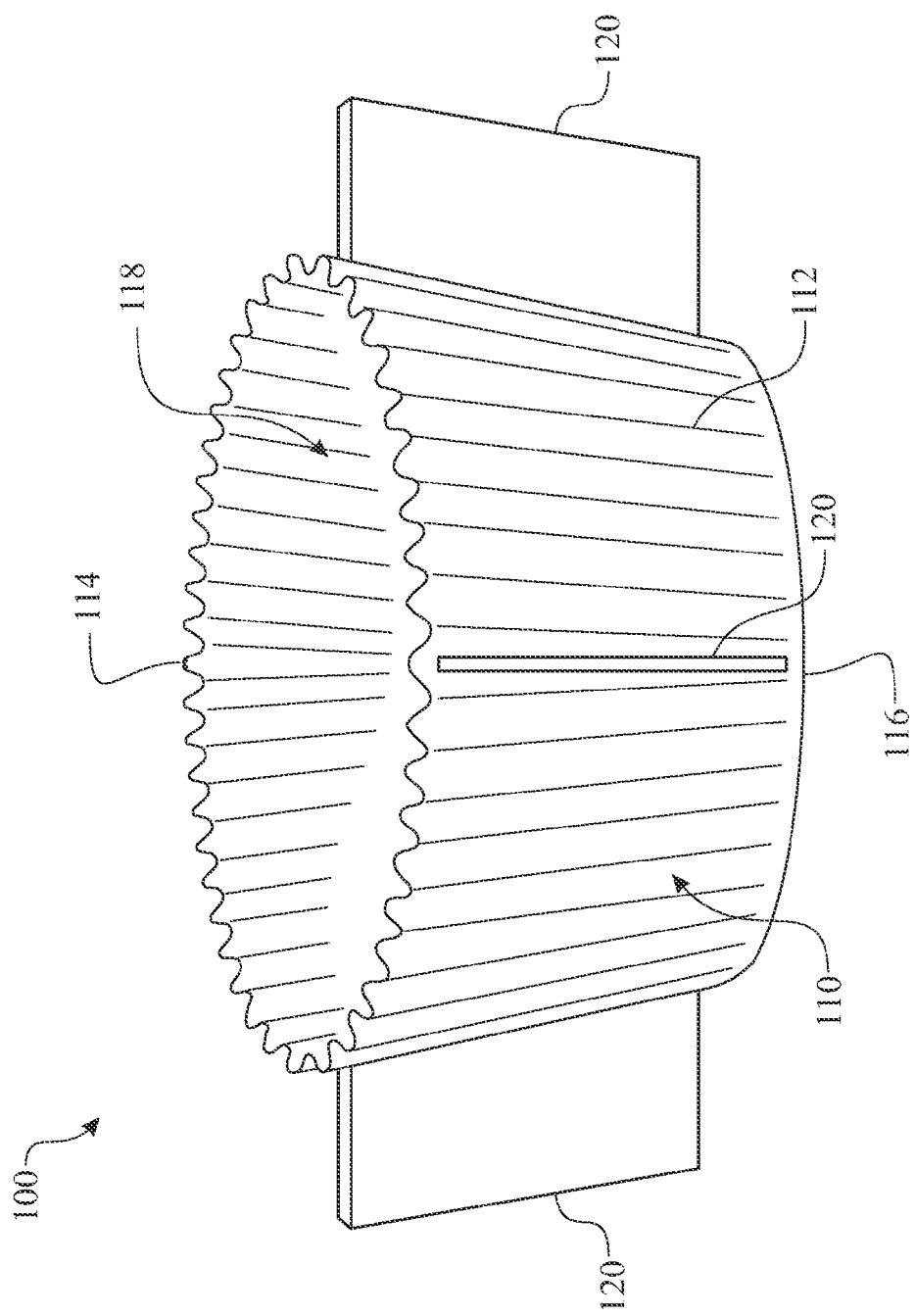
FIG. 1 presents a perspective view of an exemplary separation aiding baking cup form comprising a plurality of vertically oriented pull-tabs.
Figure 2:
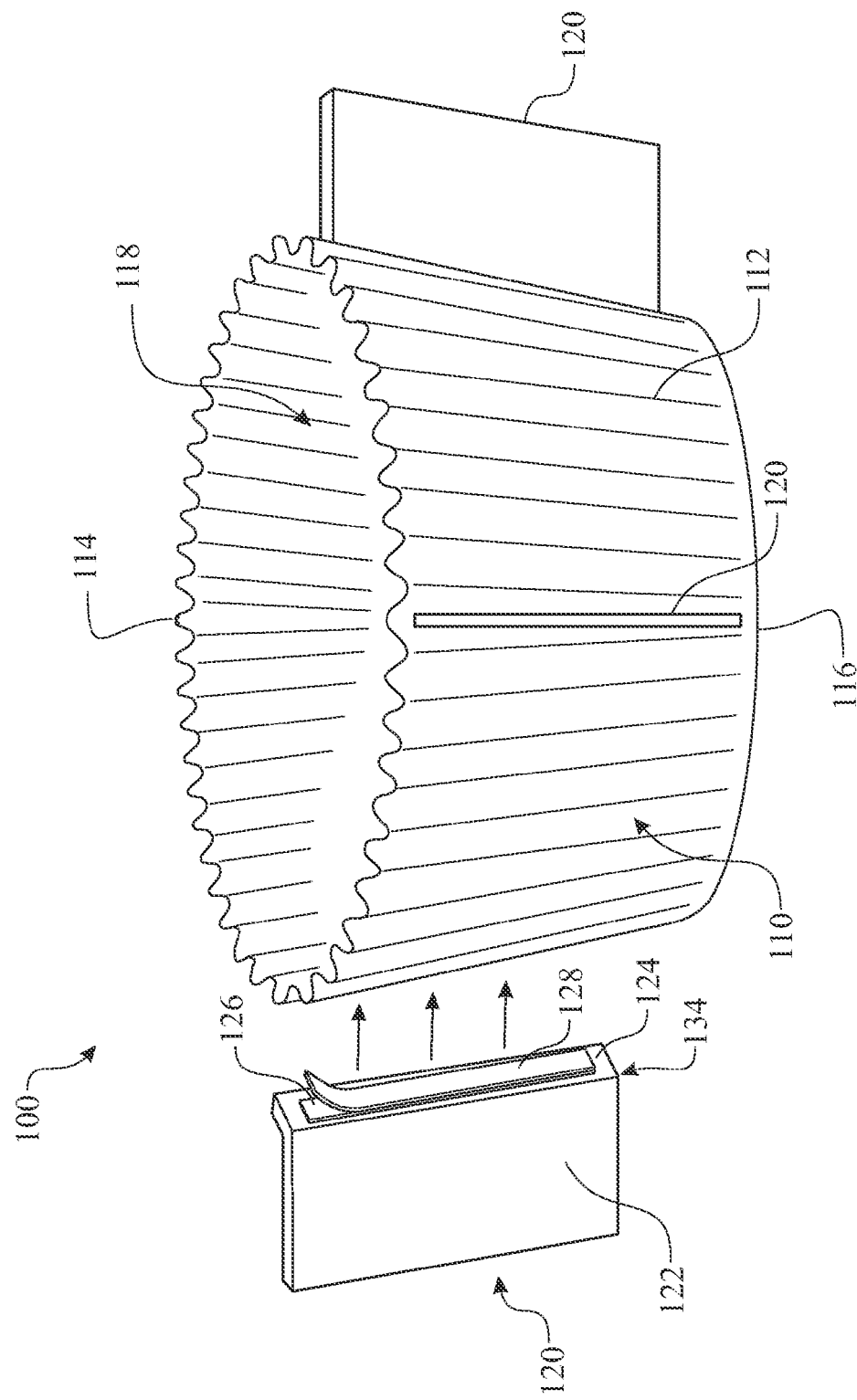
FIG. 2 presents an exploded assembly perspective view of the separation aiding baking cup form introduced in FIG. 1, the illustration detailing an exemplary attachment embodiment for bonding the vertically oriented pull-tab to the baking form.
Figure 3:
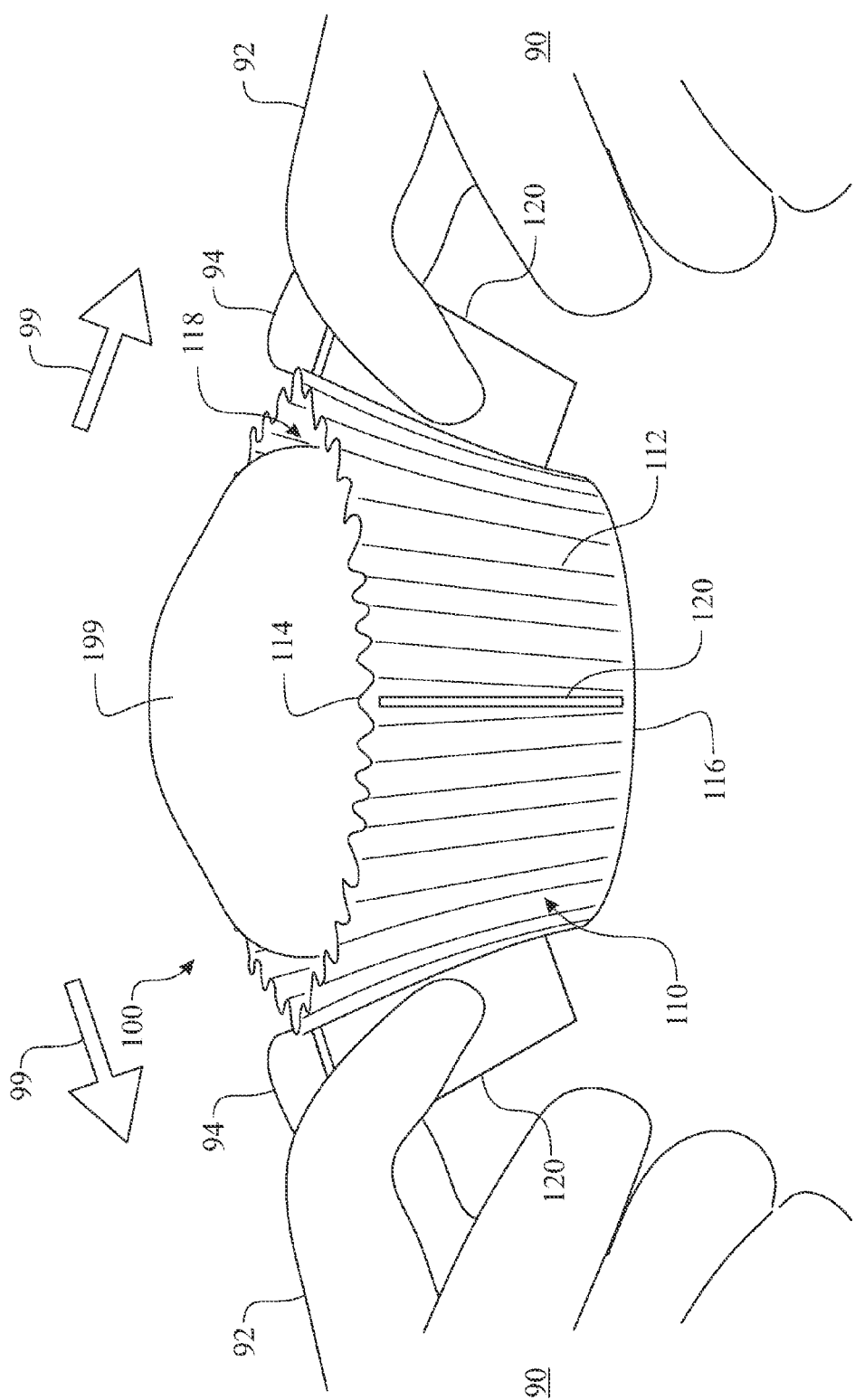
FIG. 3 presents a perspective view of the separation aiding baking cup form of FIG. 1 demonstrating a method of using the pull-tabs to aid in separating the baking form from the baked product.

The present invention integrates at least one pair of plurality of separation aiding tab assemblies 120 onto a baking cup form 110 to form a separation aiding baking cup form 100, as presented in the exemplary embodiment illustrated in FIGS. 1 through 3. The baking cup form 110 comprises features of commonly known baking cups or cupcake liners. The baking cup form 110 is created by shaping a substrate, such as paper, a thin foil, and the like, into an inverted frustum. A plurality of flutes or pleats 112 are fashioned, extending from a peripheral edge of a baking cup form base section 116 towards and terminating at a peripheral edge of the substrate, which forms an upper edge 114. The plurality of pleats 112 causes the respective section of the substrate to fold upwards from the baking cup form base section 116 forming a baked goods receiving volume 118 for receiving batter for baked goods. The batter may be dispensed into the baked goods receiving volume 118 in liquid or semi-liquid form.

A plurality of separation aiding tab assemblies 120 are attached to the baking cup form 110, wherein each separation aiding tab assembly 120 extends radially outward from an external surface of the inverted frustum and locating one separation aiding tab assembly 120 diametrically opposed to a second separation aiding tab assembly 120. Each separation aiding tab assembly 120 is fabricated having a separation aiding tab 122 and an attachment interface. Each separation aiding tab assembly 120 can be attached to the baking cup form 110 using any reasonably known method. In the first exemplary embodiment, a tab attachment flange 124 is formed parallel to a tab attachment edge 134 of each separation aiding tab assembly 120. An attachment adhesive 126 is disposed upon a bonding surface of the tab attachment flange 124. The tab attachment flange 124 is bonded to the external surface of the baking cup form 110 using any suitable non-toxic adhesive capable of surviving elevated, baking temperatures. Typical baking temperatures range between 300 and 450 degrees Fahrenheit. The exemplary separation aiding tab assembly 120 is oriented vertically, or perpendicular to a plane of the baking cup form base section 116. An optional adhesive cover tape 128 may be placed temporarily covering the attachment adhesive 126 prior to attachment of the separation aiding tab assembly 120 to the baking cup form 110. The adhesive cover tape 128 provides distribution and a shelf life for the separation aiding tab assembly 120 and enables the user to assemble the separation aiding tab assembly 120 to the baking cup form 110 as desired.

The separation aiding tab assembly 120 provides decorative and functionality to the separation aiding baking cup form 100. Functionality of the separation aiding tab assembly 120 is demonstrated in FIG. 3. Initially, the separation aiding baking cup form 100 may be placed into a cup of a baking tray. Batter is then dispensed into the baked goods receiving volume 118. The prepared tray is placed into an oven preheated to a cooking temperature and left for a period of time. Over time, the batter is baked into a baked product 199 such as a cupcake. The baked product 199 eventually ends up in hands 90 of an individual desiring to consume the baked product 199. The individual grips the separation aiding tab 122 of each diametrically opposed separation aiding tab assembly 120 using their forefinger 92 and thumb 94. The individual then pulls the separation-aiding tab 122 in opposite directions generating a cup separation motion 99. The integration of the separation aiding tab assemblies 120 avoids any pinching of the sidewall of the baking cup form 110, thus ensuring the baked product 199 remains as baked.

Figure 4:
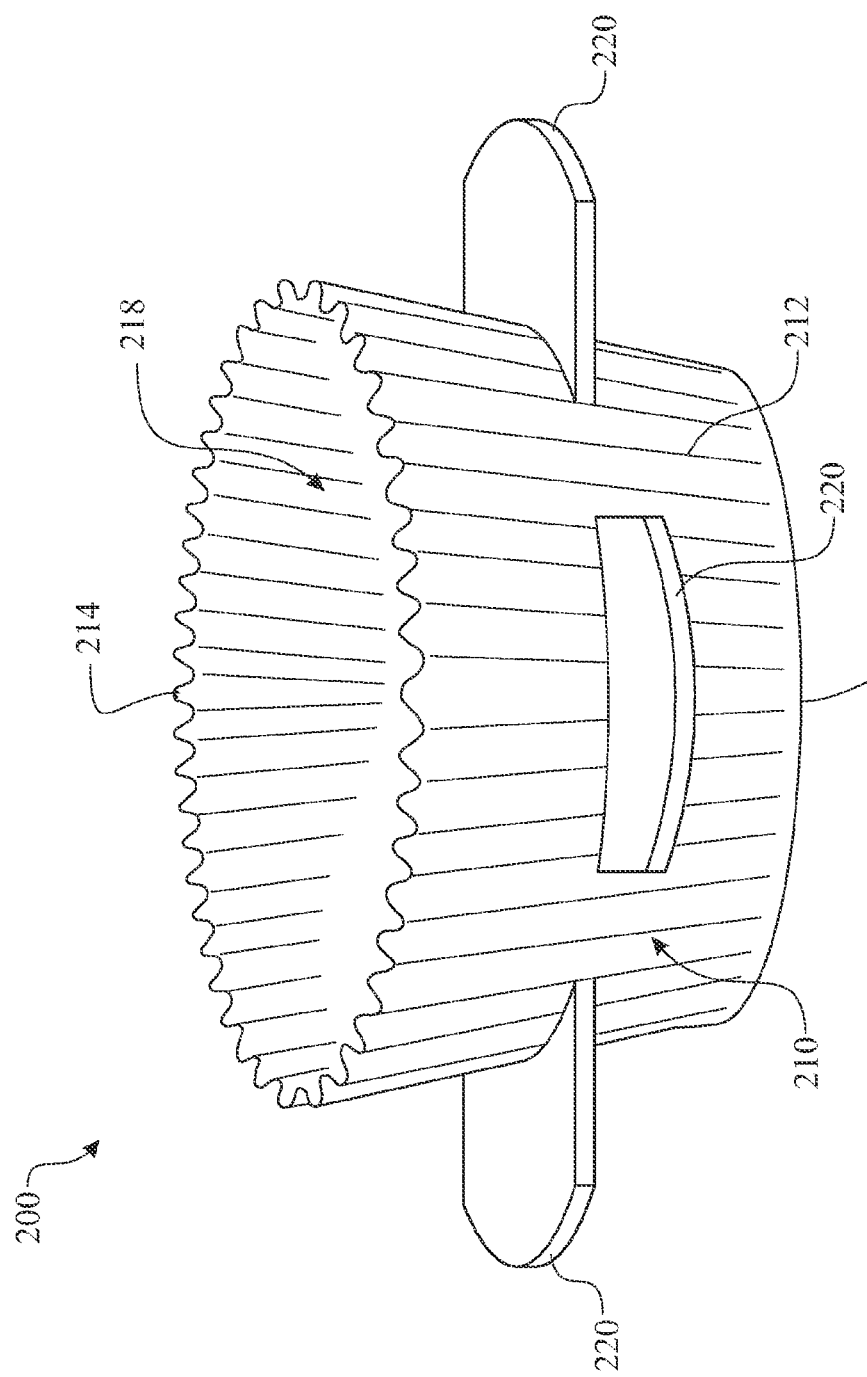
FIG. 4 presents a perspective view of a second exemplary separation aiding baking cup form comprising a plurality of horizontally oriented pull-tabs.
Figure 5:
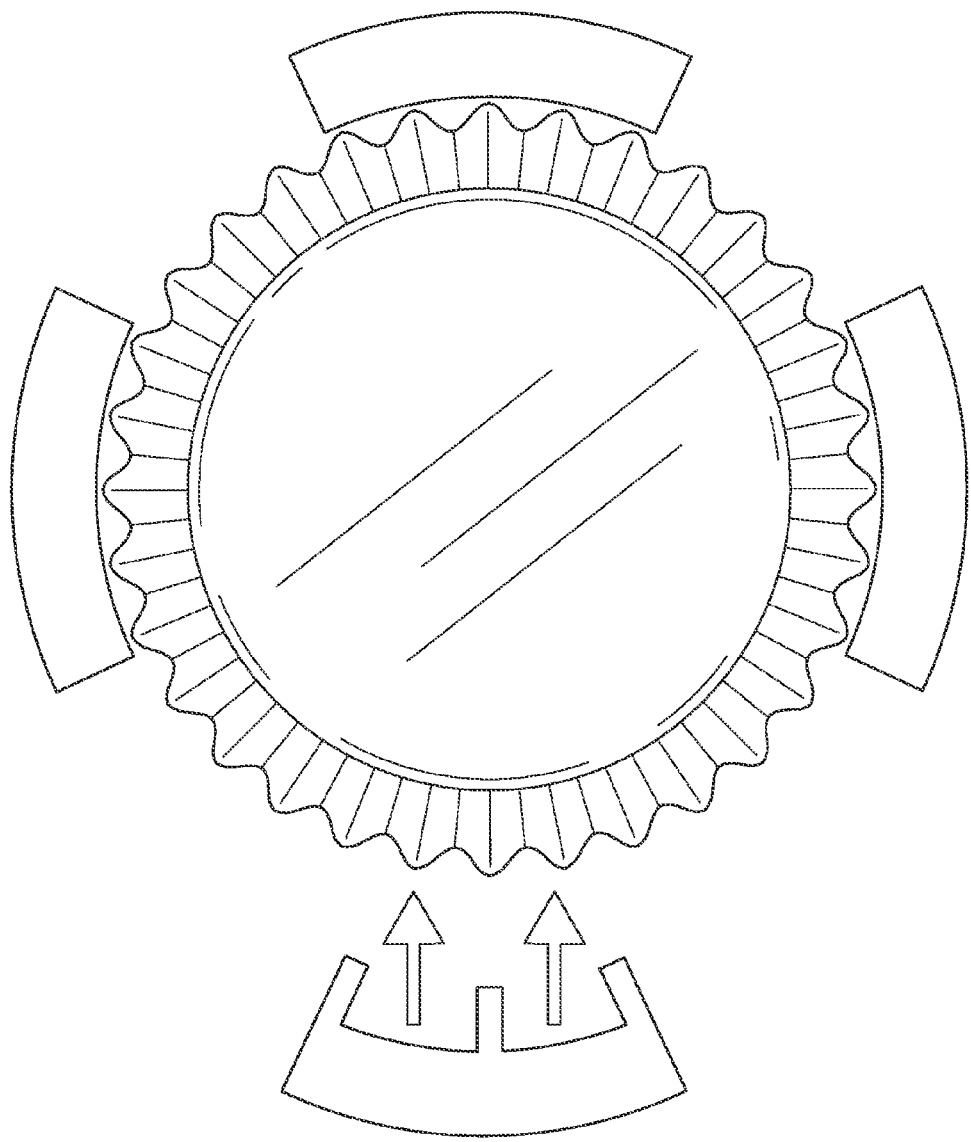
FIG. 5 presents a exploded assembly top view of the separation aiding baking cup form introduced in FIG. 4, the illustration detailing an exemplary attachment embodiment for bonding the horizontally oriented pull-tab to the baking form.

The separation aiding baking cup form 100 includes vertically oriented separation aiding tab assemblies 120. In an alternative, a second embodiment includes horizontally oriented separation aiding tab assemblies 220; as presented in the exemplary embodiment referred to as a separation aiding baking cup form 200 and illustrated in FIGS. 4 and 5. Like features of separation aiding baking cup form 200 and separation aiding baking cup form 100 are numbered the same except preceded by the numeral '2'. At least one pair of separation aiding tab assemblies 220 are attached to a baking cup form 210, wherein each separation aiding tab assembly 220 extends outward from an external surface of an inverted frustum of the baking cup form 210, having one separation aiding tab assembly 220 diametrically opposed to a second separation aiding tab assembly 220. Each separation aiding tab assembly 220 can be attached to the baking cup form 210 using any reasonably known method.

The separation aiding tab assembly 220 includes a separation aiding tab 222 defined by a distal edge 230, a pair of transverse edges 232, and a contacting edge 234 forming a peripheral edge thereabout. A series of attachment flanges 224, 225 extend outward from the contacting edge 234. Each of the attachment flanges 224, 225 are folded to a generally perpendicular relationship with the separation aiding tab 222 along the contacting edge 234. An attachment adhesive 226 or other bonding agent is provided on a bonding surface of the attachment flanges 224, 225. The attachment flanges 224, 225 are oriented horizontally, or parallel to a plane of a baking cup form base section 216. The plurality of attachment flanges 224, 225 enable attachment of the separation aiding tab assembly 220 to the baking cup form 210 without deforming the separation aiding tab 222.

Figure 6:
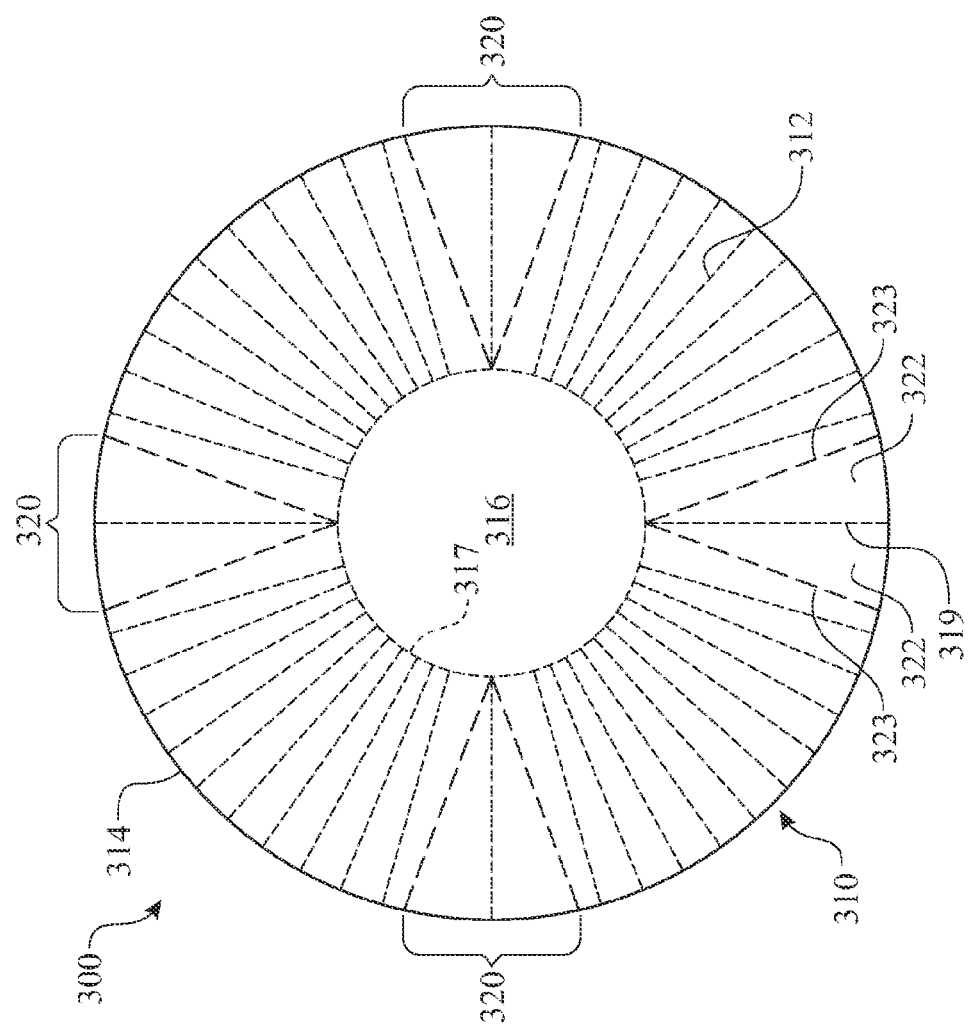
FIG. 6 presents a top plan view of an exemplary baking goods substrate prior to formation into a baking cup in accordance with a third exemplary embodiment.

The separation aiding baking cup forms 100, 200 include tabs 120, 220, which are fabricated and subsequently attached to the baking cup forms 110, 210, respectively. In yet another alternative, a third embodiment fabricates a plurality of separation aiding tab assemblies 320 by shaping a substrate. The third exemplary embodiment is referred to as a separation aiding baking cup form 300 and illustrated in FIGS. 6 and 7. Like features of separation aiding baking cup form 300 and separation aiding baking cup form 100, 200 are numbered the same except preceded by the numeral '3'. The substrate is a portion of material defined by a peripheral edge, subsequently forming an upper edge 314. The substrate can be of paper, thin foil, and the like. A peripheral sidewall section 311 of the baking cup form 310 is created by forming a plurality of flutes or pleats 312. A base transition edge 317 defines a baking cup form base section 316. Each of the pleats 312 of the peripheral sidewall section 311 is oriented perpendicular to a plane of the baking cup form base section 316, extending between the base transition edge 317 and terminating at the upper edge 314. The plurality of pleats 312 causes the respective peripheral sidewall section 311 of the substrate to fold upwards from the baking cup form base section 316 forming a baked goods containment section 318 for receiving batter for baked goods. The batter may be dispensed into the baked goods containment section 318 in liquid or semi-liquid form.

Figure 7:
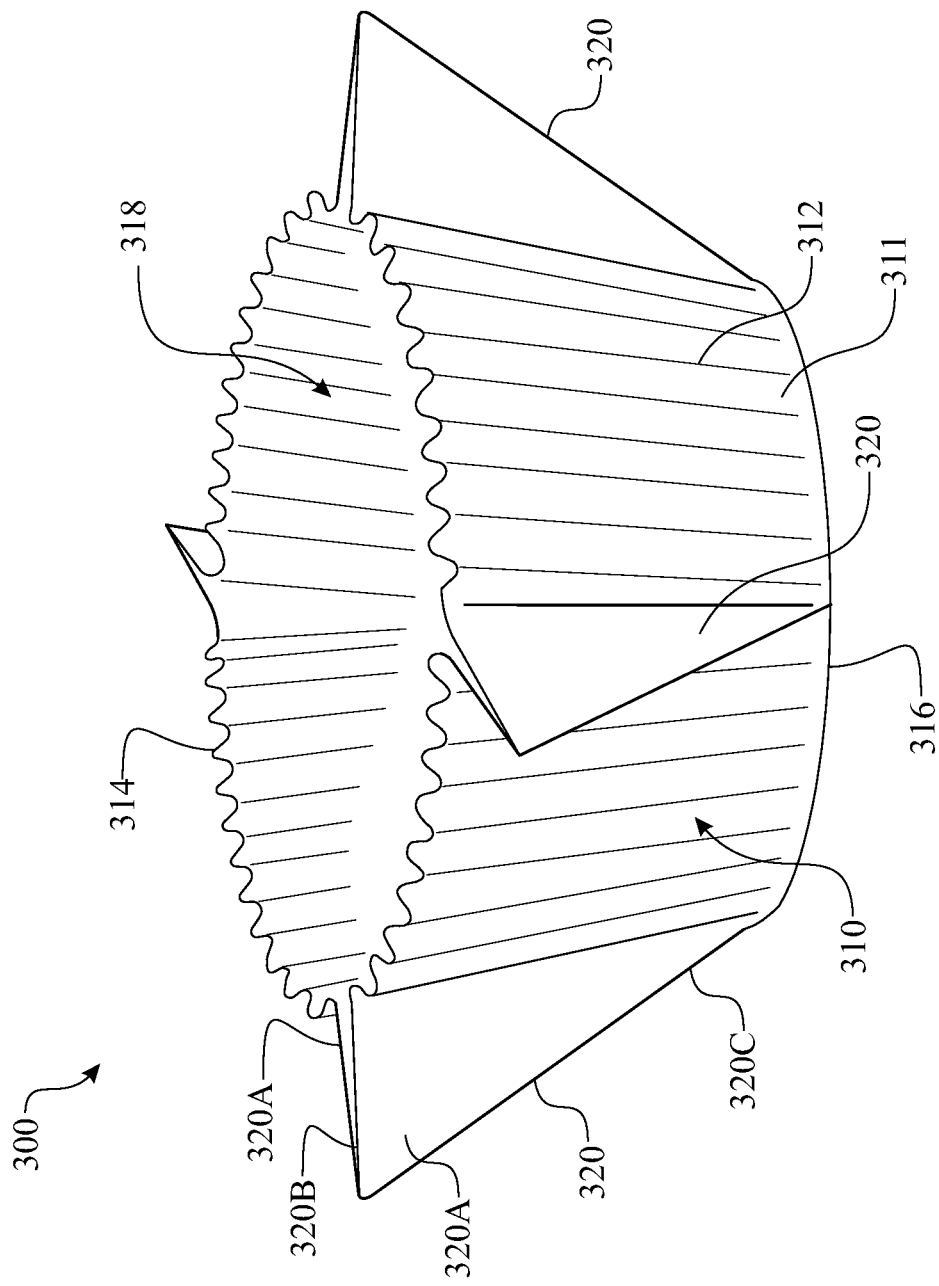
FIG. 7 presents a perspective view of the separation aiding baking cup form shaped from the substrate introduced in FIG. 6, the form comprising a plurality of integrally formed pull-tabs.

The separation aiding tab formation 320 is fabricated by bonding a pair of tab forming sections 322, each tab forming section 322 being defined between a bisecting central tab forming fold line 319 and tab forming edge fold lines 323. The substrate is folded along fold lines 319, 323, and each pair of adjacent tab forming sections 322 is bonded together forming the separation aiding tab formation 320 as illustrated in FIG. 7. The tab forming section fold lines 323 for each separation aiding tab formation 320 preferably meet at the base transition edge 317 to minimize any undesired gathering or shaping.

Figure 8:
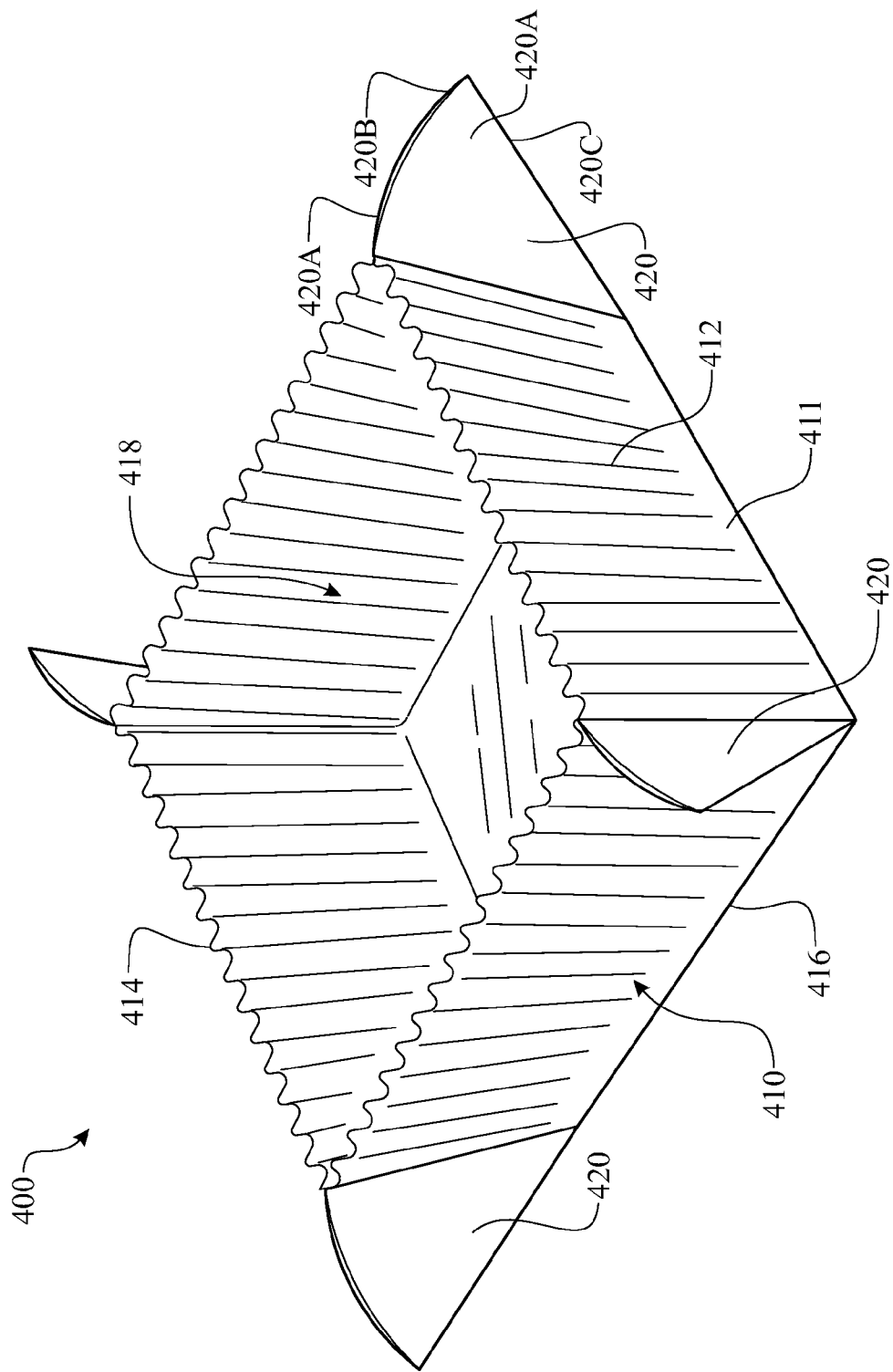
FIG. 8 presents a perspective view of a fourth exemplary separation aiding baking cup form having a rectangular shape and comprising a plurality of integrally formed pull-tabs.

The separation aiding baking cup form 300 presents a baking cup form 310 having a round or circular shape. It is understood that the baking cup form may be formed into an reasonable shape, such as a rectangular or square shape presented in a fourth exemplary embodiment referred to as a separation aiding baking cup form 400 as illustrated in FIG. 8. The separation aiding baking cup form 400 replicates the same features as the separation aiding baking cup form 300, with the only difference being the shape. Like features of separation aiding baking cup form 400 and separation aiding baking cup form 300 are numbered the same except preceded by the numeral '4'.

The separation aiding tab formations or assemblies 120, 220, 320, 420 may also be referred to as pull-tabs. For example in the exemplary embodiments illustrated in FIGS. 7 and 8, the pull tabs 320, 420 are disposed on the peripheral sidewall section 311, 411 between the base transition edge 316, 416 and the peripheral edge 314, 414 of the substrate, spaced apart from one another about the peripheral sidewall section 311, 411, and project laterally outward in opposite directions from the peripheral sidewall section 311, 411. The pull-tabs 320, 420 define opposite exterior surfaces 320A, 420A bounded by free upper edges 320B, 420B and free outer edges 320C, 420C, the exterior surfaces and free upper and outer edges being exposed for a consuming party to grip in order to pull on the pull-tabs 320, 420 to separate the baking cup form 300, 400 from the baked product therein. Also, as illustrated in the exemplary embodiments presented in FIGS. 9 through 11, the pull-tabs may include decorative features. A first exemplary decorative pull-tab 500 is representative of a holiday. Each decorative separation pull-tab 500 includes a pull-tab body 510 defined by a pull-tab peripheral edge 512. The pull-tab peripheral edge 512 is preferably shaped to resemble an object related to the desired decorative image. In the instant exemplary embodiment, the pull-tab peripheral edge 512 is shaped resembling a ghost, relating the baked goods to a holiday referred to as Halloween. The pull-tab body 510 can be enhanced with the inclusion of decorative artwork 518. Functionally, a separation aiding tab 514 is defined by a tab forming fold line 515 provided along an attachment edge of the pull-tab body 510. The decorative separation pull-tabs 500 can be provided in pairs, including a first pull-tab body 510 and a second pull-tab body 511.

A second exemplary decorative pull-tab 530 is representative of an animal, more specifically, an insect or butterfly. The decorative separation pull-tab 530 replicates the same features as the decorative separation pull-tab 500, with the only difference being the shape and descriptive likeness. Like features of decorative separation pull-tab 530 and decorative separation pull-tab 500, initially preceded by the numeral "51", are numbered the same except preceded by the numeral '54'.

A third exemplary decorative pull-tab 560 is representative of a numeric character 571 and a letter character 572, each from a set of characters. The decorative separation pull-tab 560 replicates the same features as the decorative separation pull-tab 500, with the only difference being the shape and descriptive likeness. Like features of decorative separation pull-tab 560 and decorative separation pull-tab 500, initially preceded by the numeral "51", are numbered the same except preceded by the numeral '57'. It is understood that the numeric design 571 is representative of one or more sets of tabs comprising a series of numbers between 0 and 9. It would be preferred to include two sets, enabling one to reference an exact age of an individual. It is understood that the letter design 572 is representative of one or more sets of tabs comprising a series of alphabetical characters between A and Z. It would be preferred to include two or more sets, enabling one to reference an individual's initials, phrases, words, and the like.

Other exemplary designs can include:
  a. holiday characters, including Santa Clause, the Easter Bunny, Cupid, Monsters, Veterans, and the like;
  b. holiday objects, including a Christmas Tree, a Shamrock, a flag, stars, fireworks, and the like;
  c. general characters, including cartoon characters, celebrities, and the like;
  d. seasonal related designs, including snowflakes, a sun, fall leaves, spring flowers, and the like;
  e. sports related designs, including sporting balls (footballs, basketballs, baseballs, soccer balls), sporting goods (hockey sticks, hockey pucks, basketball hoops, baseball diamonds, football fields, soccer fields, racetracks, bicycles, motor cross bikes, and the like);
  f. animal/pet related designs, including domestic animals, wild animals, insects (such as an exemplary decorative separation pull-tab 530), and the like;
  g. transportation related images, including Autos, trucks, rockets, planes, trains, ships, and the like;
  h. buildings;
  i. tools, including power tools, hand tools, heavy equipment, and the like;
  j. toys, games, and the like;
  k. corporate, product and other logos;
  l. numeric designs, including one or more sets of tabs comprising a series of numbers between 0 and 9 (such as an exemplary numeric separation pull-tab 571); and
  m. letter designs, including one or more sets of tabs comprising a series of alphabetical characters between A and Z (such as an exemplary alphabetical separation pull-tab 572).

Figure 12:
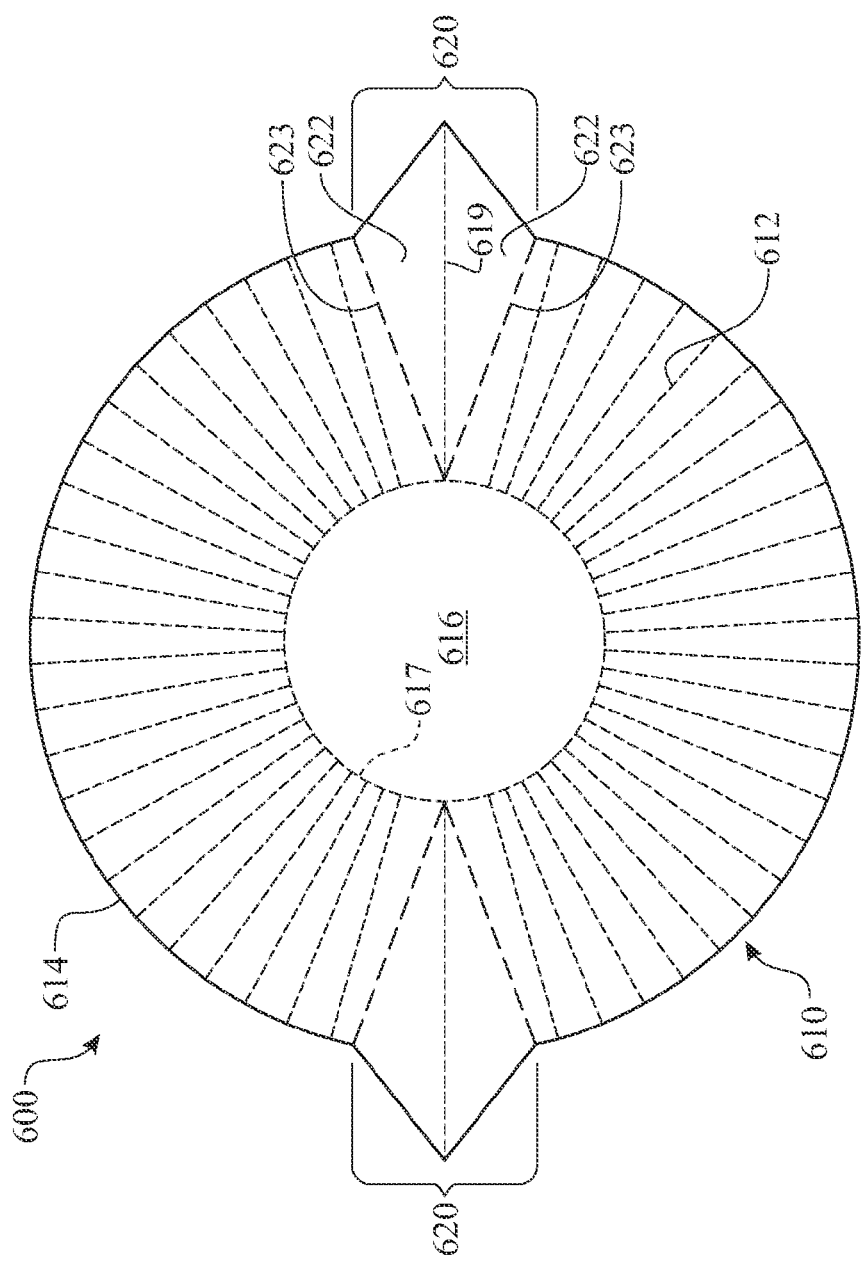
FIG. 12 presents a top plan view of an exemplary baking goods substrate prior to formation into a baking cup in accordance with a fourth exemplary embodiment.
Figure 13:
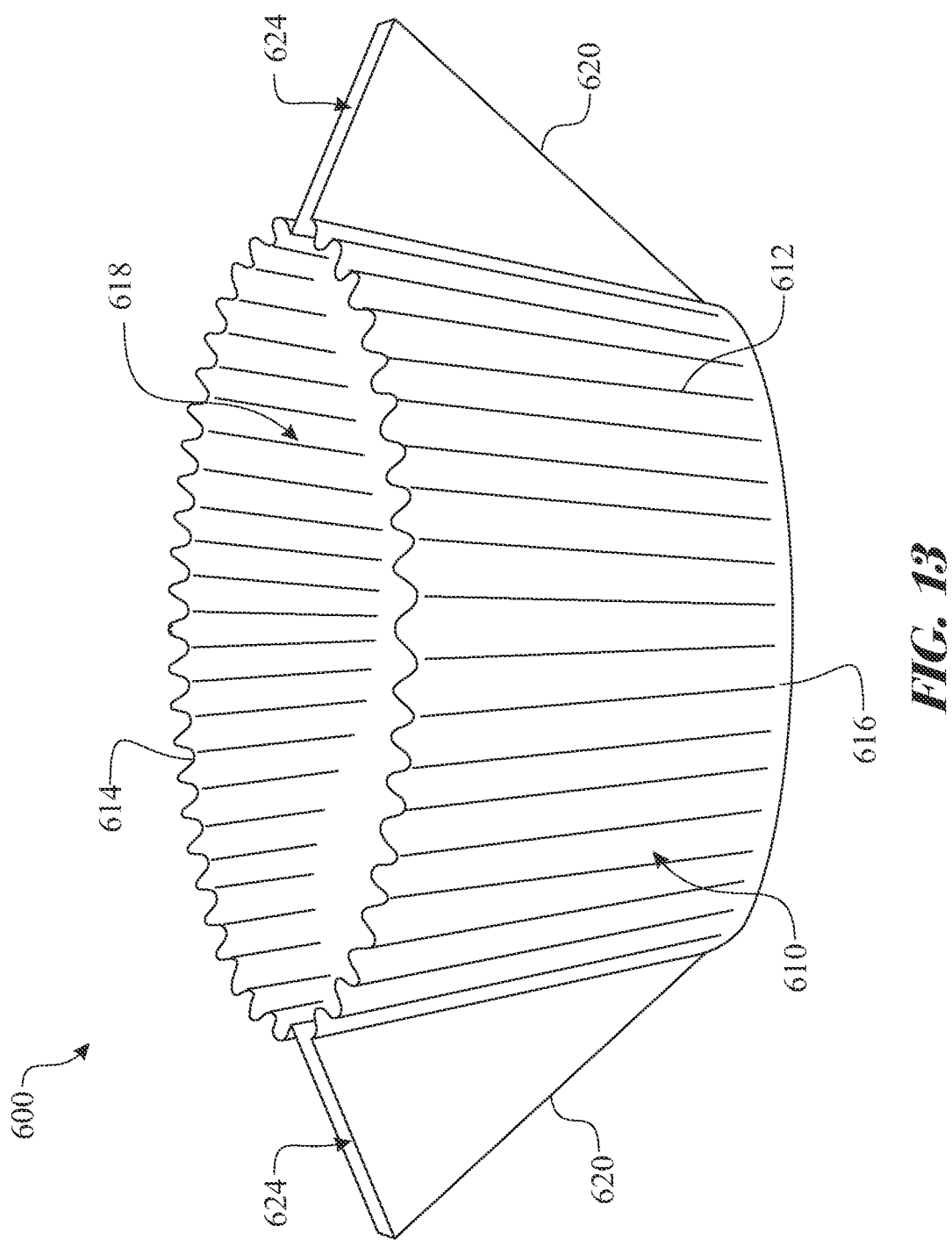
FIG. 13 presents a perspective view of the separation aiding baking cup form shaped from the substrate introduced in FIG. 12, the form comprising a plurality of integrally formed pull-tabs.
Figure 14:
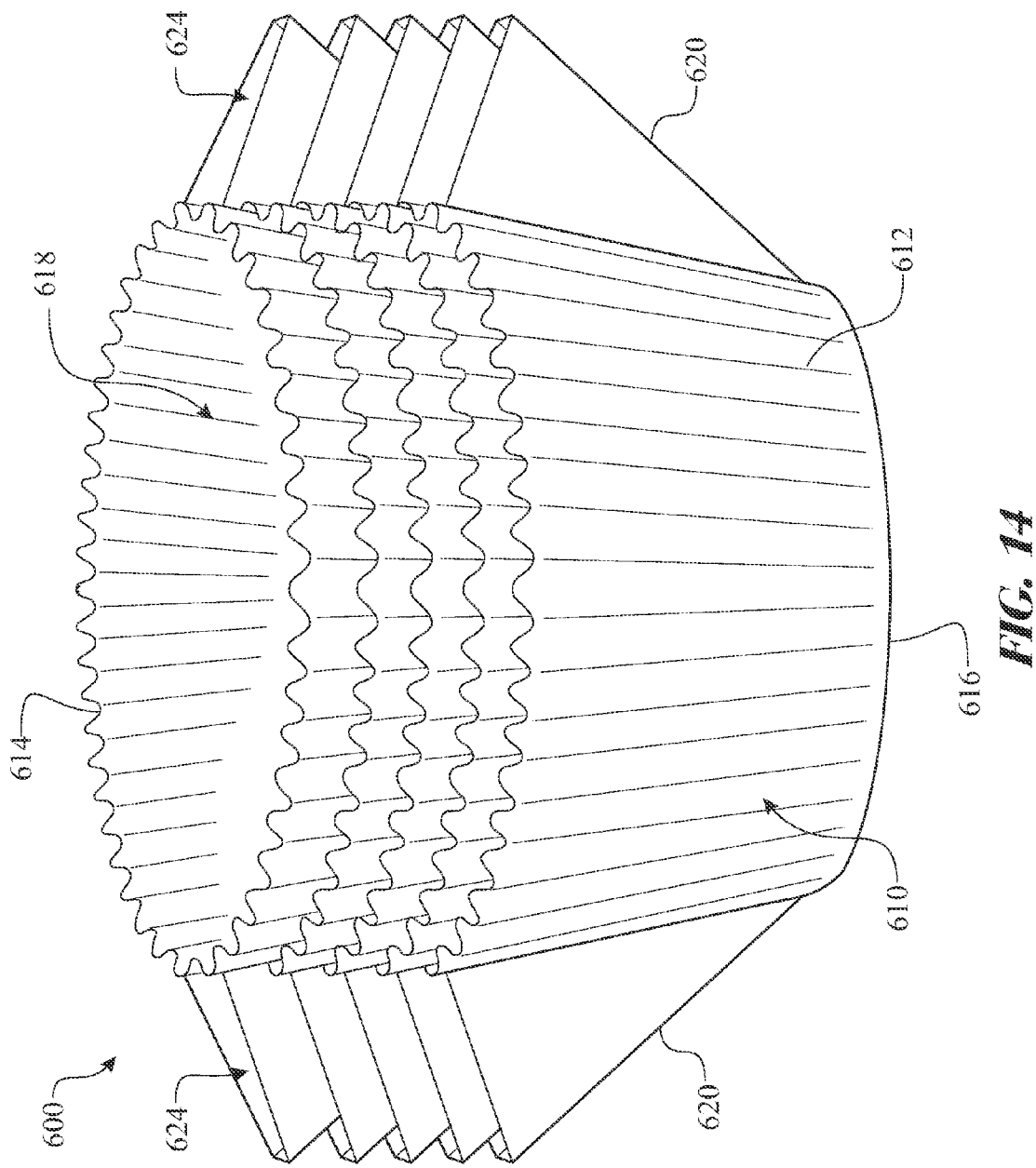
FIG. 14 presents a perspective view of the separation aiding baking cup form shaped from the substrate introduced in FIG. 12, the illustration presenting a nesting capability of a plurality of separation aiding baking cup forms.

The separation aiding baking cup form 400 can be modified by forming the pull-tabs 420 using an alternative process which is exclusive of a joining process as illustrated in the exemplary embodiment referred to as a separation aiding baking cup form 600, which is presented in FIGS. 12 through 14. Like features of separation aiding baking cup form 600 and separation aiding baking cup form 300 are numbered the same except preceded by the numeral '6'. The separation aiding tab formation 620 is formed into the desired finished shape, as illustrated in FIG. 13, using a shaping process similar to the process described for the separation aiding baking cup form 300, exclusive of the bonding process. The separation aiding tab formation 620 is fabricated by folding a pair of tab forming sections 622, each tab forming section 622 being defined between central fold line 619 and edge fold 623. The substrate is folded along fold lines 619, 623, and each pair of adjacent tab forming sections 622 is folded to contact one another forming the separation aiding tab formation 620 as illustrated in FIG. 13. The tab forming section fold lines 623 for each separation aiding tab formation 620 preferably meet at the base transition edge 617 to minimize any undesired gathering or shaping. The previous disclosed embodiments of the separation aiding baking cup form 100, 200, 300, 400 require one to fold the separation pull-tabs 120, 220, 320, 420 in order to nest a plurality of the separation aiding baking cup forms 100, 200, 300, 400. A tab void 624 is formed between the adjacent, folded tab forming sections 622 enabling nesting of a plurality of separation aiding baking cup forms 600 as illustrated in FIG. 14.

Figure 15:
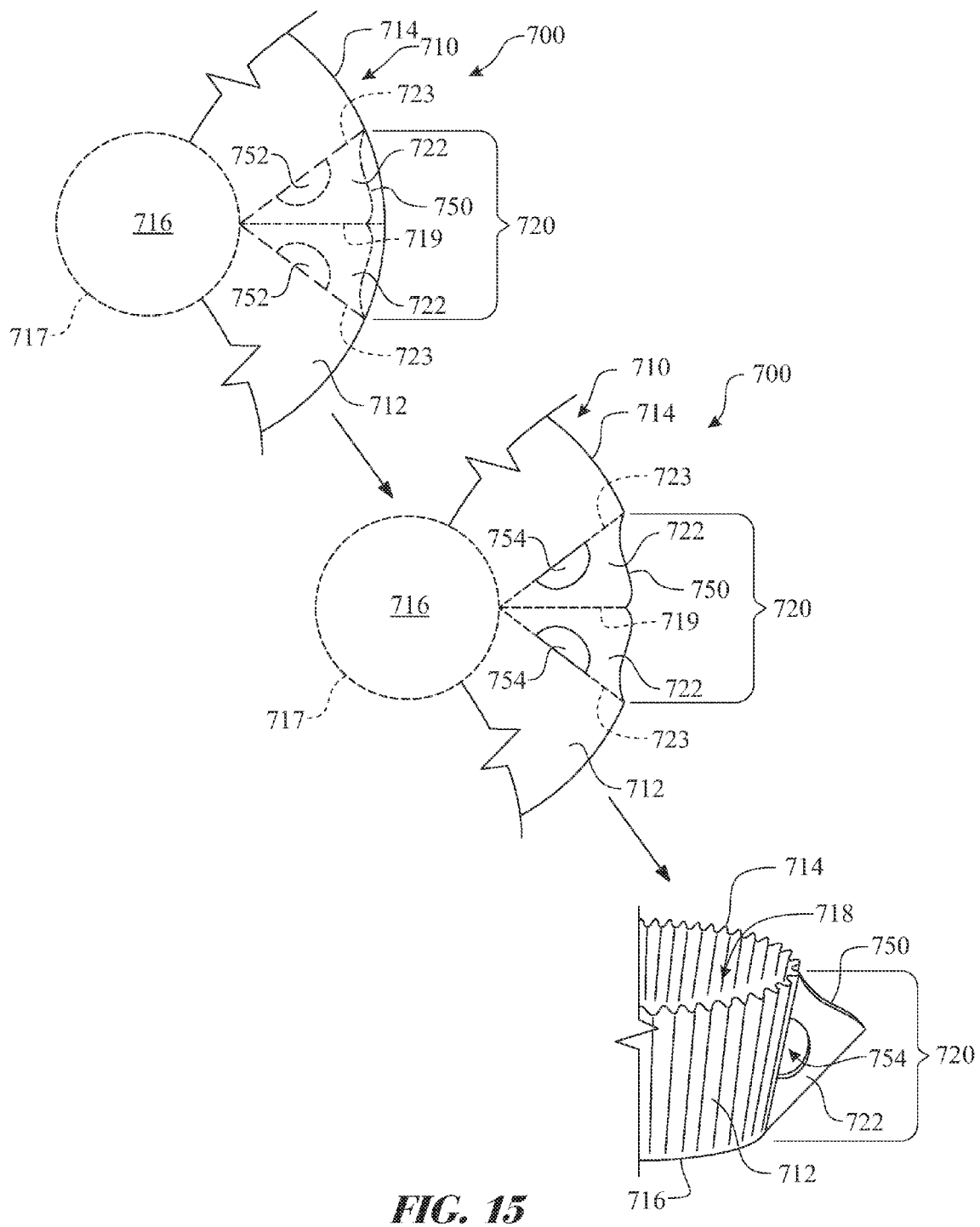
FIG. 15 presents a series of steps for fabricating an aesthetically pleasing and functionally enhanced baking cup form grip.

The separation aiding baking cup form 300, 600 can be modified to include aesthetically pleasing features. An exemplary embodiment incorporating aesthetically pleasing features and gripping enhancements is referred to as a separation aiding baking cup form 700, which is detailed in FIG. 15. Like features of separation aiding baking cup form 700 and separation aiding baking cup forms 300, 600 are numbered the same except preceded by the numeral '7'. The separation aiding tab formation 720 is an enhancement of the separation aiding tab formation 320, 620, wherein the separation aiding tab formation 720 can include at least one of a shaped tab peripheral edge 750 and a tab aperture 754.

The shaped tab peripheral edge 750 can be shaped in any aesthetically pleasing design. It is desired that the shaped tab peripheral edge 750 is designed and shaped in a mirror image about a tab forming fold line 719. As illustrated in the separation aiding tab formation 620, the shaped tab peripheral edge 750 can extend outward from a circular circumference forming the upper edge 714 of the baking cup form 710. It is understood that the shaped tab peripheral edge 750 can be designed into any desired shape. The shaped tab peripheral edge 750 can be shaped independent of the natural circular circumference of the upper edge 714, remaining within the circumference, extending beyond the circumference, or both.

The tab aperture 754 can be provided in any suitable shape. The tab aperture 754 is initially provided as a tab aperture design 752. The tab aperture design 752 is removed from the tab forming section 722 forming the tab aperture 754. The tab aperture design 752 an be removed using any removal process, including a cutting process, a stamping process, a sheering process, a punch process, a laser scribing process, and the like. It is desired that the tab aperture design 752, and the resulting tab aperture 754, be designed and shaped in a mirror image about a tab forming fold line 719. The tab aperture 754 can be located within any portion of the tab forming section 722. The exemplary embodiment extends the tab aperture 754 from each respective tab forming section fold line 723. Alternatively, the tab aperture 754 can be cut through a central portion of the tab forming section 722. In a configuration where the tab aperture 754 extends from the tab forming fold line 719, the end result would be a separation aiding tab formation 720 having a shaped, non-linear outer vertical edge.

In a first step, a layout is generated for the baking cup form 710. The layout would define the general shape and size of the separation aiding baking cup form 700. The design of the separation aiding baking cup form 700 would then be enhanced by incorporating the layout for the shaped tab peripheral edge 750 and the tab aperture design 752. In a second step, the features are shaped by any cutting process known by those skilled in the art. In a third step, the baking cup form 710 is shaped into the finished separation aiding baking cup form 700.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A separation aiding baking cup form, said baking cup form comprising:
   a substrate, comprising:
      a planar base section defined by a base transition edge of said substrate; and
      a peripheral sidewall section defined between said base transition edge and a peripheral edge of said substrate, said peripheral sidewall section is shaped as a series of pleats extending from said base transition edge radially outward towards said peripheral edge,
   wherein the series of pleats of said peripheral sidewall section extend in an angular relation to said planar base section taking a shape of an inverted frustum to form a receiving volume for receiving a batter for baking a product therein; and
   a pair of pull-tabs disposed on said peripheral sidewall section between said base transition edge and said peripheral edge of said substrate, spaced apart from one another about said peripheral sidewall section, and projecting laterally outward in opposite directions from said peripheral sidewall section, each pull-tab comprising:
      a bisecting central tab forming fold line extending radially from said base transition edge to said peripheral edge;
      a pair of tab forming section edge fold lines, each tab forming section edge fold line extending angularly outward from an intersection between said bisecting central tab forming fold line and said base transition edge and terminating at said peripheral edge; and
      a pair of tab forming sections, each tab forming section is defined between one of said pair of tab forming section edge fold lines and said bisecting central tab forming fold line,
   wherein each pull-tab is shaped by an outward fold formed along each of said pair of tab forming section edge fold lines and an inward fold formed along said bisecting central tab forming fold line, and
   wherein a first of said pair of tab forming sections is positioned adjacent to a second of said pair of tab forming sections forming each of said pull-tabs so as to define opposite exterior surfaces bounded by free upper and outer edges on each of said pull-tabs being exposed for a consuming party to grip in order to pull on said pull-tabs to separate the baking cup form from the baked product therein.

2. A separation aiding baking cup form as recited in claim 1, further comprising, wherein an interior surface of each of said pair of tab forming sections are bonded to one another.

3. A separation aiding baking cup form as recited in claim 1, wherein one of said pair of pull-tabs is located diametrically opposed to the second of said pair of pull-tabs.

4. A separation aiding baking cup form as recited in claim 1, said at least one pull-tab further comprises a shaped peripheral edge, wherein the shaped peripheral edge extends between each of the tab forming section edge fold lines.

5. A separation aiding baking cup form as recited in claim 1, each of said pair of tab forming sections further comprising a tab aperture passing through said substrate.

* * * * *